H. M. STITZER.
STUMP-PULLERS.
No. 195,544. Patented Sept. 25. 1877.
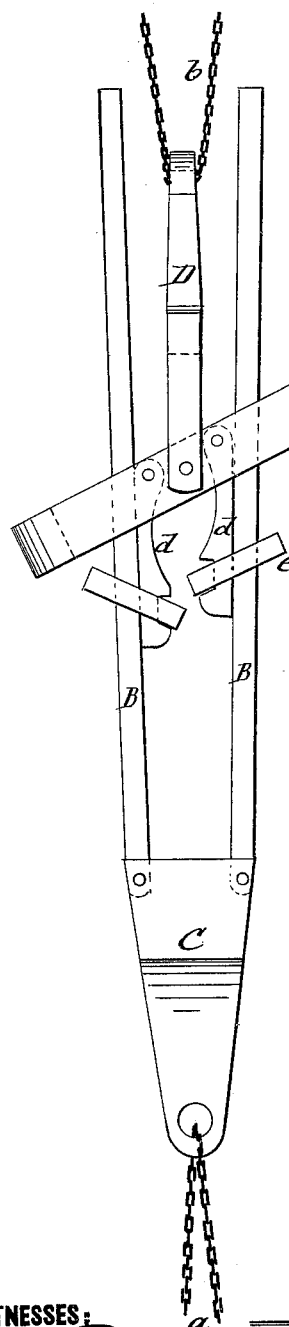
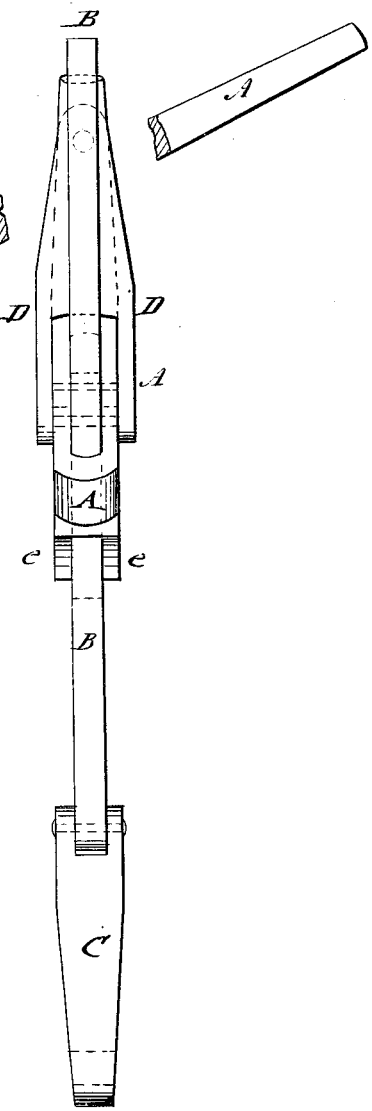

UNITED STATES PATENT OFFICE.

HENRY M. STITZER, OF COCHRANTON, PENNSYLVANIA.

IMPROVEMENT IN STUMP-PULLERS.

Specification forming part of Letters Patent No. 195,544, dated September 25, 1877; application filed May 28, 1877.

*To all whom it may concern:*

Be it known that I, HENRY M. STITZER, of Cochranton, in the county of Crawford and State of Pennsylvania, have invented an Improved Stump-Puller, of which the following is a specification:

In the accompanying drawing, Figure 1 represents a top view, Fig. 2 a side view, of my improved stump-puller in enlarged scale; and Fig. 3, a perspective view, showing mode of attaching device to the stumps for pulling.

Similar letters of reference indicate corresponding parts.

The invention relates to an improved device for pulling stumps, rocks, and other bodies in simple and effective manner, by making use of another stump or fixed body, close to the one to be pulled; and it consists of a single or double beam, attached at one end by a chain to a stump or other object, and of a draft-link, connected by a chain to another stump and pivoted to a hand-lever, combined with pivoted pawls and wedge-links, of peculiar construction, that work the link forward on the beam by the rocking of the lever.

In the drawing, A represents the operating hand-lever, and B the beam, of my improved stump-pulling device, the beam being made single or double, as desired. If a double beam is used, the bars of the same are preferably coupled to an end block, C, jointed thereto, to facilitate the working of the beam. The end of the beam or block is securely anchored by a chain, *a*, to a stump or other fixed object near the stump, rock, or other object to be pulled, and a second chain, *b*, attached to a pivoted draft-link, D, of the hand-lever, and passed around and secured to the stump to be pulled.

The hand-lever A moves by means of guide-slots on the beam, and is worked forward along the same by means of recessed pivot-pawls *d* and wedge-links *e*. Said links *e* are loosely arranged about the bars B and the recessed portion of the pawls *d*, so that they may be entirely detached therefrom, when desired. These links being loosely arranged, also, they turn upon their recessed seats in the pawls *d* in their progression along the plain bars B, so that in advancing alternately along the bar to take a new hold they slip freely over the same; but when strained in the opposite direction, in exercising the draft, they turn and cramp against and bind with the bars, and thus give a purchase for the draft-strain.

A jack or other support is placed under the chain *b*, near the stump to be pulled, and the hand-lever then carried forward and back, the alternating action of the pawls and wedge-links producing the forward motion of the link by the rocking motion of the lever, and thereby the stretching of the chain and the gradual lifting and extracting of the stump.

Having thus described my invention, I claim as new and desire to secure by Letters Patent—

The pivoted and recessed pawls *d*, combined with the hand-lever A, the plain bars B, and the wedge-links *e*, loosely arranged to encompass the bars B and the recessed end of the pawls, for the purpose described.

HENRY M. STITZER.

Witnesses:
 DAVID ADAMS,
 S. B. ADAMS.